United States Patent
Kaihata

(10) Patent No.: US 10,825,331 B2
(45) Date of Patent: Nov. 3, 2020

(54) ANTITHEFT DEVICE AND ANTITHEFT SYSTEM

(71) Applicant: TAKAYA CORPORATION, Ibara-shi (JP)

(72) Inventor: Keita Kaihata, Ibara (JP)

(73) Assignee: TAKAYA CORPORATION, Okayama (JP)

( * ) Notice: Subject to any disclaimer, the term of this patent is extended or adjusted under 35 U.S.C. 154(b) by 0 days.

(21) Appl. No.: 16/489,023

(22) PCT Filed: Mar. 6, 2018

(86) PCT No.: PCT/JP2018/008458
§ 371 (c)(1),
(2) Date: Aug. 27, 2019

(87) PCT Pub. No.: WO2018/164090
PCT Pub. Date: Sep. 13, 2018

(65) Prior Publication Data
US 2020/0005629 A1 Jan. 2, 2020

(30) Foreign Application Priority Data
Mar. 6, 2017 (JP) .................. 2017-042117

(51) Int. Cl.
*G08B 13/14* (2006.01)
*G08B 25/10* (2006.01)
(Continued)

(52) U.S. Cl.
CPC .............. *G08B 25/10* (2013.01); *G01S 13/56* (2013.01); *G08B 13/22* (2013.01)

(58) Field of Classification Search
CPC .......... G08B 25/10; G08B 13/22; G01S 13/56
See application file for complete search history.

(56) References Cited

U.S. PATENT DOCUMENTS 5,223,815 A * 6/1993 Rosenthal .......... G08B 13/1427
340/531
2008/0309491 A1* 12/2008 Gillard ................. G08B 25/009
340/572.1
(Continued)

FOREIGN PATENT DOCUMENTS

JP      2-171892       7/1990
JP      2016-24688     2/2016
(Continued)

*Primary Examiner* — Munear T Akki
(74) *Attorney, Agent, or Firm* — Cozen O'Connor

(57) ABSTRACT

There is provided an antitheft device and an antitheft system capable of reliably detecting theft via a simple installation method. The antitheft device includes a receiver 12 that receives a radio wave of a predetermined frequency, and a microcomputer (controller) 18 that determines whether or not the antitheft device is located at a position where it is impossible to detect a radio wave of a predetermined frequency by the receiver 12. The microcomputer (controller) 18 performs an alarming operation, upon determining that the antitheft device is located at a position where it is impossible to detect a monitoring radio wave WW of a predetermined frequency by the receiver 12. Accordingly, it suffices to attach the antitheft device 10 to a managed object MO such as a commercial item being monitored, and therefore it is not necessary to extend a cable from a sensor part attached to the commercial item.

5 Claims, 7 Drawing Sheets

(51) Int. Cl.
   *G01S 13/56* (2006.01)
   *G08B 13/22* (2006.01)

(56) References Cited

U.S. PATENT DOCUMENTS

2014/0055266 A1* 2/2014 Valiulis .............. G08B 13/1481
                                                   340/572.1
2015/0091729 A1* 4/2015 Phillips ................ G08B 13/149
                                                    340/568.2

FOREIGN PATENT DOCUMENTS

JP      2017-505968      2/2017
WO   WO 2012/035586   3/2012

\* cited by examiner

ANTITHEFT DEVICE AND ANTITHEFT SYSTEM

RELATED APPLICATIONS

This is a U.S. National Phase Application under 35 USC 371 of International Application PCT/JP2018/008458 filed on Mar. 6, 2018.

This application claims the priority of Japanese application no. 2017-042117 filed Mar. 6, 2017, the entire content of which is hereby incorporated by reference.

TECHNOLOGICAL FIELD

The present invention relates to an antitheft device and an antitheft system for monitoring theft of a commercial item placed on a retail shelf, or the like, in a store.

BACKGROUND

Conventionally, there is disclosed an antitheft system of the aforementioned type in Patent Literature 1 described below. The antitheft system includes: a child device having a function that allows for detecting theft provided that a plurality of cable-type sensors have been wired to a commercial item, and being capable of wirelessly transmitting a state identification signal; and a parent device capable of wirelessly receiving the state identification signal from the child device. In addition, both the parent device and the child device respectively have a warning part. The child device, upon detecting theft of a commercial item, triggers an alarm and performs wireless transmission to the parent device using a frequency A, whereby the parent device also triggers an alarm. In a case where connection of the child device is disabled, the child device triggers an alarm and performs wireless transmission to the parent device using a frequency B, whereby the parent device also triggers an alarm.

The antitheft system disclosed in the Patent Literature 1 described above has the following problems. Specifically, the sensor part to be attached to a commercial item is of a cable type, and therefore required to be connected to the child device. Additionally, wiring of cables turns out to be complicated in a case where commercial items are expected to be monitored for antitheft purpose. Furthermore, when there are a predefined number of cable-type sensors to be attached to child devices and a larger number of commercial items to be monitored than the predefined number of sensors, it is necessary to increase the number of child devices, which may result in a disordered and bad-looking retail shelf of the store.

Patent Literature

Patent Literature 1: WO Publication No. 2012/035586

SUMMARY

The present invention, which has been made in view of the aforementioned background art, is intended to provide an antitheft device and an antitheft system capable of reliably detecting theft via a simple installation method.

In order to achieve the object described above, an antitheft device according to the present invention includes a receiver that receives a radio wave of a predetermined frequency, and a controller that determines whether or not the antitheft device is located at a position where it is impossible to detect a radio wave of the predetermined frequency by the receiver, and performs a warning operation upon determining that the antitheft device is located at a position where it is impossible to detect a radio wave of the predetermined frequency.

According to the antitheft device described above, the controller performs a warning operation upon determining that the antitheft device is located at a position where it is impossible to detect a radio wave of the predetermined frequency by the receiver, whereby it suffices to attach the antitheft device to a managed object such as a commercial item being monitored, and therefore it is not necessary to extend a cable from a sensor part attached to the commercial item.

According to a specific aspect of the present invention, the antitheft device described above further includes a movement detector that detects a movement of a main body including the receiver and the controller. In such a case, it is possible to monitor an act of moving, which is comparable to theft, an object being monitored and having the antitheft device attached thereto.

According to another aspect of the present invention, the movement detector is one of: an acceleration sensor, a gyro sensor, a vibration sensor, a geomagnetic sensor, and a GPS sensor. In such a case, it is possible to detect a movement of the main body easily with a high precision.

According to yet another aspect of the present invention, the controller performs a warning operation upon detecting a movement of the main body and also failing to detect a radio wave of the predetermined frequency. There is also a case where failure of detecting a radio wave of the predetermined frequency may be attributed to termination of a transmitter that transmits a radio wave of the predetermined frequency due to blackout or breakdown, and therefore postulating detection of a movement of the main body as a prerequisite condition allows for reliably avoiding malfunction.

According to yet another aspect of the present invention, the controller performs a warning operation upon detecting a movement of the main body and also failing to detect a radio wave of the predetermined frequency, determining an angle of acceleration, and existing a difference of the angle equal to or larger than a predetermined value. In such a case, a warning operation may be performed, also taking into account the angle determination result, whereby the reliability of the warning operation may increase.

According to yet another aspect of the present invention, the controller performs a warning operation upon detecting a movement of the main body, and also having determined for a plurality of times feasibility of detecting a radio wave of the predetermined frequency within a predetermined period of time, and having transferred from a detected state to an undetected state of the radio wave. In other words, no warning operation is performed in a case where the undetected state of the radio wave has been continuing since when a movement of the main body was first detected, assuming that a user is rearranging the commercial items, with emission of the radio wave having been terminated.

According to yet another aspect of the present invention, the controller operates the receiver intermittently. In such a case, it is possible to suppress power consumption of the receiver and reduce the number of times of maintenance works such as battery exchange, of the antitheft device.

According to yet another aspect of the present invention, the controller operates the receiver upon the movement detector detecting a movement.

In order to achieve the object described above, the antitheft system according to the present invention has the antitheft device described above and a transmitter that transmits a radio wave of the predetermined frequency.

According to the antitheft system described above, it suffices to attach the antitheft device to a managed object such as a commercial item being monitored, and therefore it is not necessary to extend a cable from a sensor part attached to the commercial item, and therefore it is possible to provide an antitheft system capable of reliably detecting theft via a simple installation method.

BRIEF DESCRIPTION OF DRAWINGS

FIG. 3 is a flowchart for explaining an operation of the antitheft device, or the like;

FIG. 6 is a flowchart for explaining an operation of an exemplary variation of the antitheft device, or the like; and FIG. 7 is a flowchart for explaining an operation of another exemplary variation of the antitheft device, or the like.

DETAILED DESCRIPTION OF EMBODIMENTS

In the following, an antitheft device and an antitheft system of an embodiment according to the present invention will be described, referring to FIG. 1 and FIG. 2.

Figure 1:
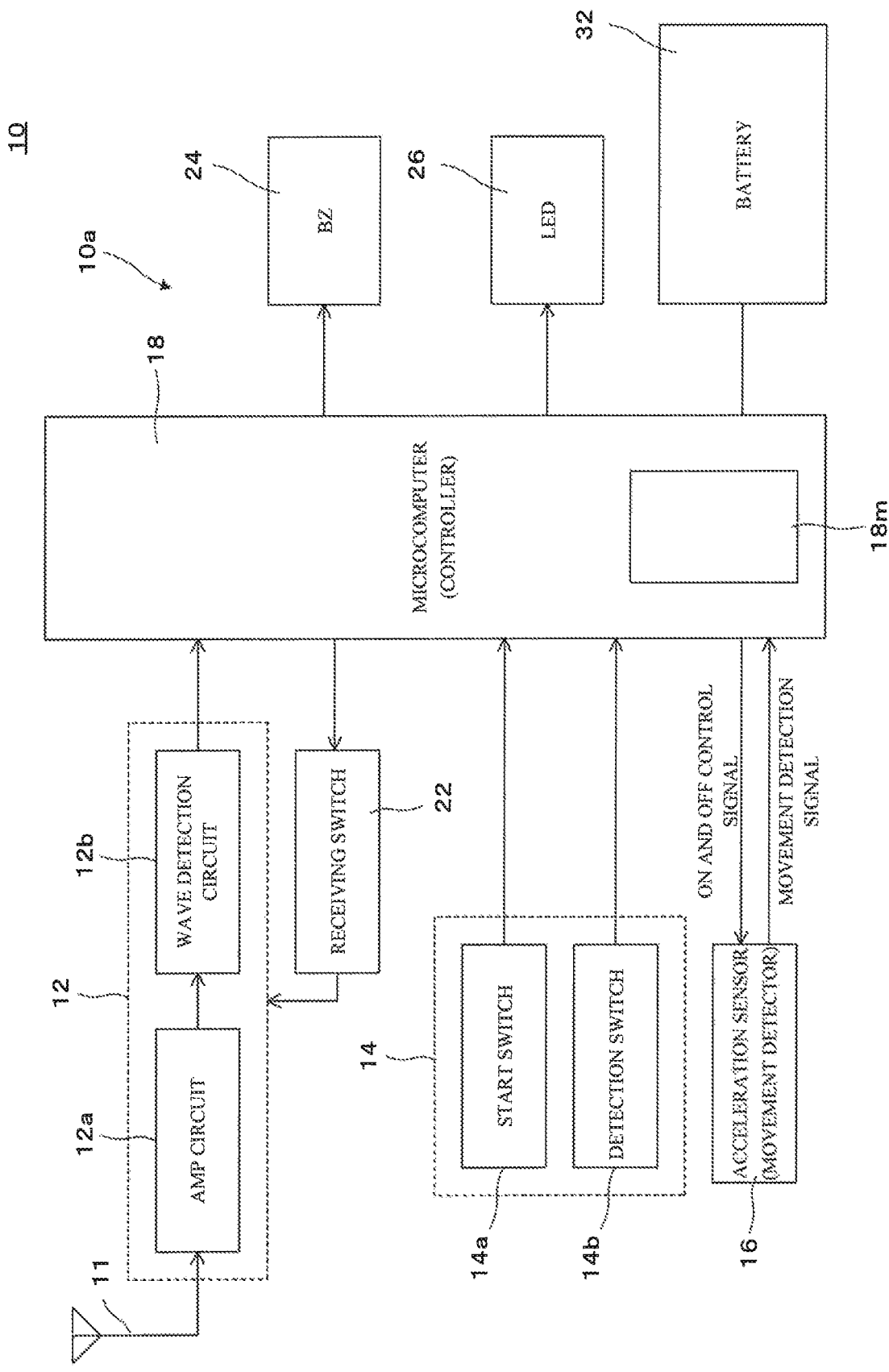
FIG. 1 is a block diagram for explaining an antitheft device of a first embodiment.

An antitheft device 10 illustrated in FIG. 1 is typically realized as a self-ringing antitheft tag. The antitheft device 10, which is detachably fixed to a managed object such as a commercial item, includes a receiver 12, a switch part 14, an acceleration sensor 16, a microcomputer 18, a buzzer 24, an LED 26, and a battery 32.

The receiver 12 includes an AMP circuit 12a for amplification and a wave detection circuit 12b. The AMP circuit 12a has built therein a tuning circuit that amplifies and subsequently extracts an 8.2 MHz monitoring radio wave, for example, which has been received by an antenna 11. The receiver 12 allows for receiving at any time an 8.2 MHz monitoring radio wave, for example, which has been output from a transmitter 50 (see FIG. 2 described below) for forming a monitoring area.

The switch part 14 has a start switch 14a and a detection switch 14b. The start switch 14a and the detection switch 14b are provided on the surface of a case 10b (see FIG. 2 described below) of the antitheft device 10 so that movable parts thereof are exposed. The start switch 14a is intended to activate the microcomputer 18, and touching the start switch 14a with a finger through the case 10b causes the microcomputer 18 to start operating. Upon the microcomputer 18 starting operation, a wait mode is first invoked, followed by a detection mode, and subsequently a monitoring mode is invoked. In the wait mode, pressing the detection switch 14b within a predetermined period of time causes a transfer to the detection mode, whereas the wait mode is re-entered unless the detection switch 14b is pressed within a predetermined period of time. The detection mode, which is a mode before attaching the antitheft device 10 to a managed object such as a commercial item, transfers to the monitoring mode after a predetermined period of time. In addition, the monitoring mode, which is a characteristic operation for detecting a take-out of the antitheft device 10, will be specifically described in detail below. The detection switch 14b turns ON when pressed with the antitheft device 10 being attached to a managed object such as a commercial item, and turns OFF when it returns to a protruding state with the antitheft device 10 being removed from the managed object. Upon the detection switch 14b turning OFF in a state where the microcomputer 18 is operating, the microcomputer 18 determines that the antitheft device 10 is in a warning-required state (specifically, an alarm-required state accompanying audio warning, for example).

The acceleration sensor 16 is a movement detector that detects a movement of a main body 10a or the case 10b including the receiver 12 and the microcomputer 18. The acceleration sensor 16 accepts ON and OFF control signals from the microcomputer 18, perform a detection operation only at a timing when it has received an ON signal from the microcomputer 18 and turned into an operating state, and turn into a sleep state when it has received an OFF signal from the microcomputer 18 so that power consumption may be suppressed. The acceleration sensor 16, upon being turned ON by the microcomputer 18, detects an acceleration applied to the antitheft device 10, i.e., a movement of the antitheft device 10, and outputs a movement detection signal to the microcomputer 18. In other words, the acceleration sensor 16 operates intermittently, specifically, it operates periodically or irregularly. Here, the acceleration sensor 16 cooperates with the microcomputer 18 to function as an angle determiner that evaluates the variation of the movement direction of the main body 10a, i.e., the angular variation corresponding to variation of the orientation of acceleration, and determines the angular variation of acceleration.

The microcomputer 18, which is a controller, is formed of an integrated circuit including a CPU, a memory device, or the like. The microcomputer 18, receiving power supply from a battery 32 in the form of a button cell, performs an operation according to a program. An operation of the antitheft device 10 including the microcomputer 18 will be described below.

The buzzer 24, which is driven by the microcomputer (controller) 18 to operate, triggers an alarm by ringing a predetermined alarm sound, upon determining that the microcomputer 18 in a warning-required state. The LED 26, which is also driven by the microcomputer 18 to operate, triggers an alarm together with the buzzer 24 by turning ON and OFF, upon determining that the microcomputer 18 in a warning-required state.

The receiving switch 22 provided in association with the receiver 12 is intended to turn the receiver 12 into an operating state or a sleep state. The receiving switch 22, upon receiving an ON signal from the microcomputer (controller) 18, operates the receiver 12 to detect a monitoring radio wave. In addition, the receiving switch 22 turns the receiver 12 into a sleep state upon receiving an OFF signal from the microcomputer (controller) 18, whereby power consumption may be suppressed. In other words, the receiver 12 operates intermittently, specifically, it operates periodically or irregularly. The receiver 12, upon receiving a monitoring radio wave, outputs the received signal to the microcomputer 18. In other words, the microcomputer 18 determines that it is impossible to detect a monitoring radio wave, in a case where no received signal has been received from the receiver 12 even though a receiving command has been issued from the receiving switch 22.

Figure 2:
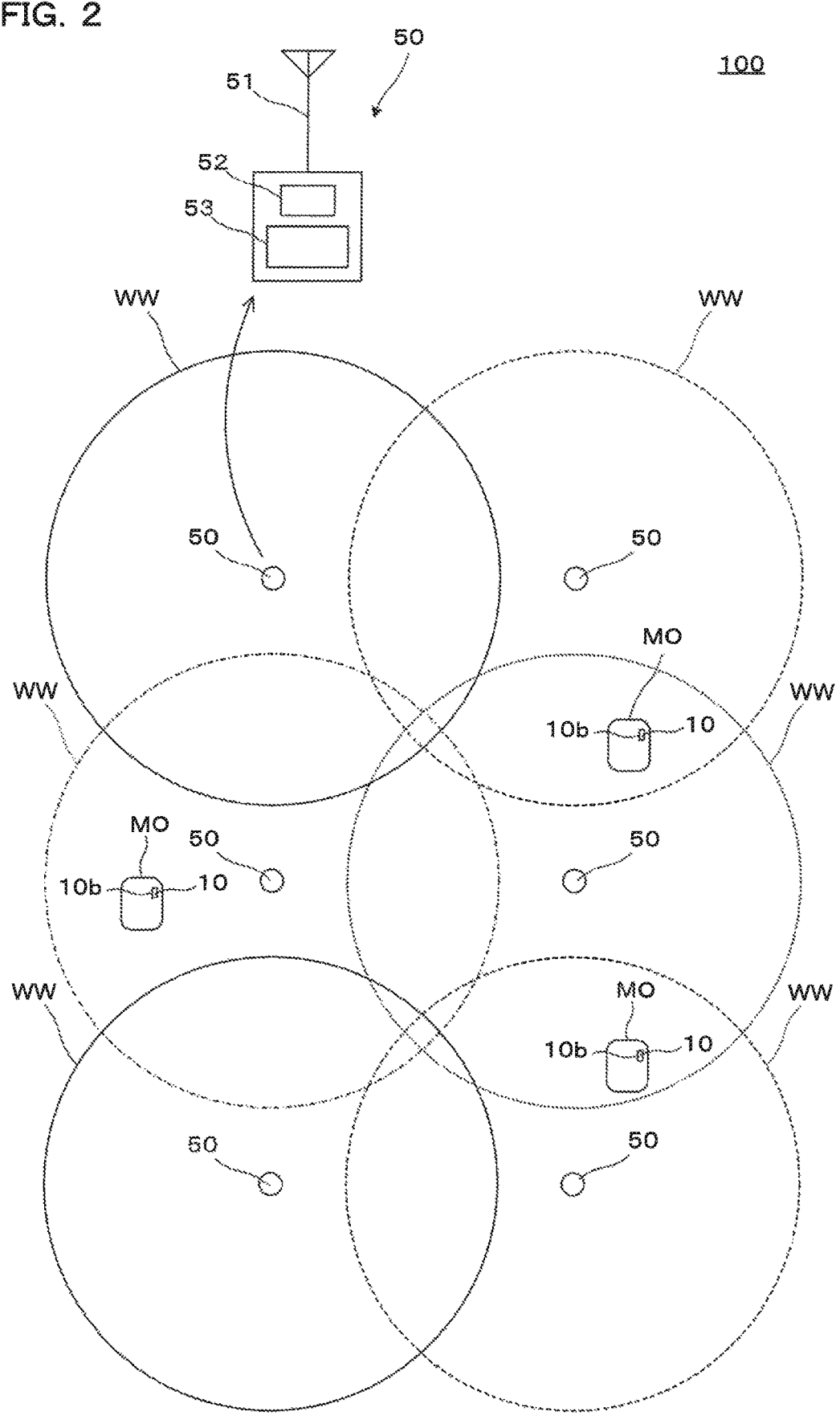
FIG. 2 is an explanatory diagram of the antitheft system having the antitheft device of FIG. 1 built therein.

FIG. 2 is an explanatory diagram of a crime prevention system 100 as an antitheft system including the antitheft device 10 illustrated in FIG. 1. The crime prevention system (antitheft system) 100 includes one or more transmitters 50 and one or more antitheft devices 10. In the illustrated example, the transmitters 50 are arranged on grid points, with a monitoring radio wave WW emitted around from each of the transmitters 50 forming a 2-dimensional monitoring area, allowing a desired monitoring area to be formed by the monitoring radio wave WW emitted from the plurality of transmitters 50. The transmitter 50 has an antenna 51, a radio wave transmission circuit 52, and a transmission side controller 53, as illustrated in an enlarged manner. The radio wave transmission circuit 52 continuously outputs the monitoring radio wave WW of 8.2 MHz, for example, via the antenna 51 during the monitoring period. Although the monitoring radio wave WW may be something like a carrier wave, it may also be devoted to carry a predetermined signal. In a case of carrying a predetermined signal on the monitoring radio wave WW, the possibility of misdetection of the monitoring radio wave WW by the antitheft device 10 may be reduced.

Note that each of the antitheft devices 10 is detachably fixed to each managed object MO existing in a monitoring area defined by a plurality of groups of the monitoring radio wave WW.

Figure 3:
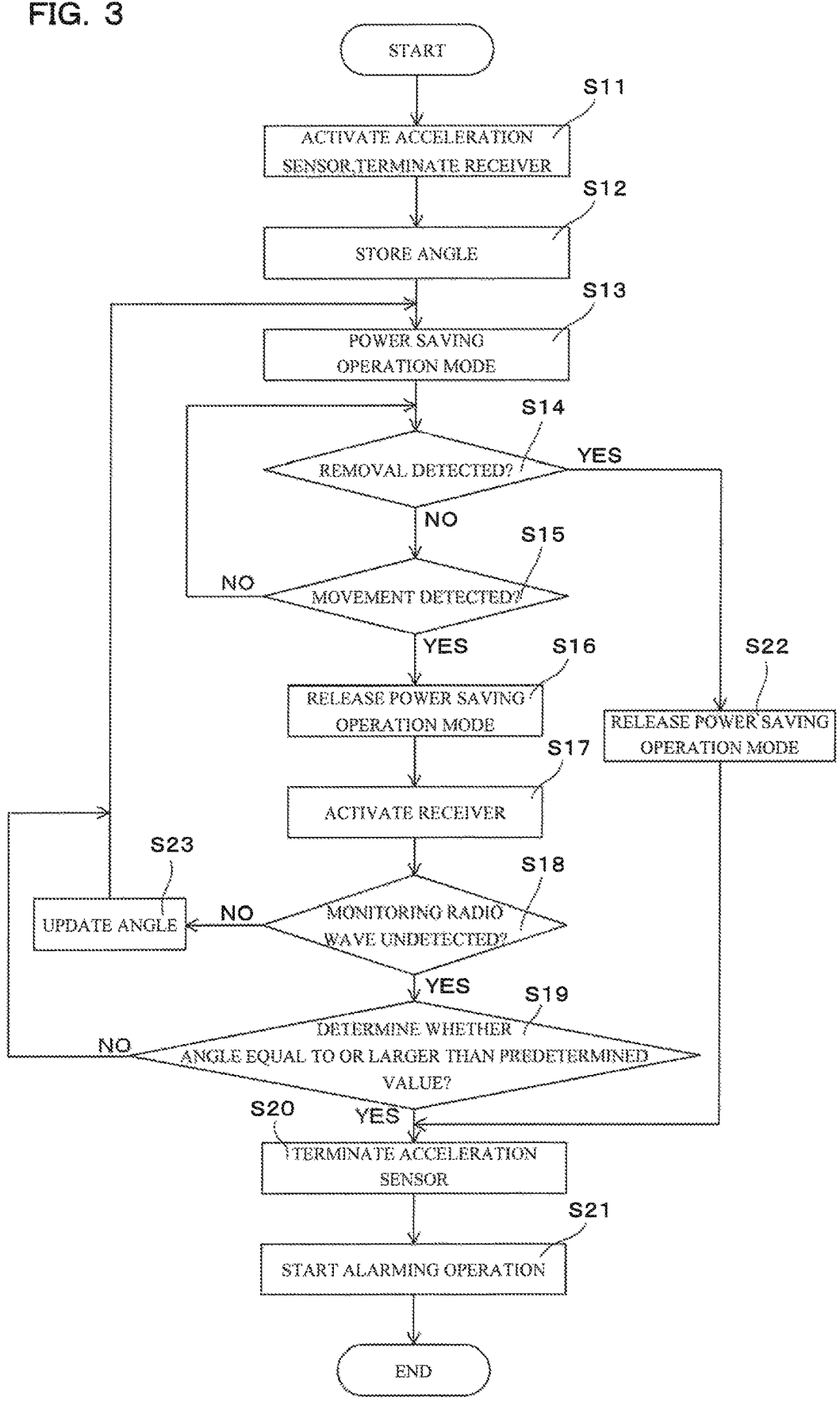

Referring to FIG. 3, an exemplary operation in the monitoring mode, among the operations of the crime prevention system (antitheft system) 100 or the antitheft device 10, will be described.

First, in the antitheft device 10, the microcomputer (controller) 18 activates and causes the acceleration sensor (movement detector) 16 to detect an acceleration applied to the antitheft device 10, i.e., the movement of the antitheft device 10 (step S11). On this occasion, the microcomputer (controller) 18 terminates the receiver 12 via the receiving switch 22.

The microcomputer (controller) 18 stores an angle corresponding to the amount of variation of the current acceleration of the antitheft device 10 to a storage 18m (step S12). The microcomputer (controller) 18 then starts a substantial operation of the monitoring mode in a state where the movement and angle of the antitheft device 10 may be detected although detection of the monitoring radio wave WW is not performed.

Next, the microcomputer (controller) 18 transfers to a power saving operation mode in which only minimally required operation is performed to consume minimal power (step S13).

Next, the microcomputer (controller) 18 determines whether or not a detection signal has been received from the detection switch 14b, that is, whether or not the antitheft device 10 has been removed (step S14).

In a case where it is determined at step S14 that the antitheft device 10 has not been removed (NO at step S14), the microcomputer (controller) 18 determines whether or not an input of a movement detection signal has been received from the acceleration sensor (movement detector) 16, that is, whether or not a movement of the antitheft device 10 has been detected (step S15).

The microcomputer (controller) 18, upon detecting a movement of the antitheft device 10 (YES at step S15), releases (cancels) the power saving operation mode (step S16), and activates the receiver 12 via the receiving switch 22 to detect the monitoring radio wave WW (step S17). Detection of the monitoring radio wave WW by activating the receiver 12 corresponds to the start of operation in the intermittent operation of the receiver 12. On the other hand, in a case where the microcomputer 18 has not detected a movement of the antitheft device 10 (NO at step S15), the microcomputer 18 returns to step S14 and determines whether or not the antitheft device 10 has been removed. In other words, a movement of the antitheft device 10 is repeatedly and periodically detected unless removal of the antitheft device 10 is detected.

The microcomputer (controller) 18, upon failing to receive a signal of the monitoring radio wave WW from the receiver 12 (YES at step S18) in a state where a movement of the antitheft device 10 or the main body 10a has been detected, compares the angle stored at step 12 and the current angle (step S19). On the other hand, in a case where the microcomputer 18 has received a signal of the monitoring radio wave WW from the receiver 12 (NO at step S18), the microcomputer 18 updates the angle stored at step 12 (step S23), returns to step S13 and transfers to the power saving operation mode, and subsequently determines whether or not the antitheft device 10 has been removed (step S14). In the aforementioned steps, transfer to the power saving operation mode corresponds to end of operation in the intermittent operation of the receiver 12.

The microcomputer (controller) 18, upon failing to receive a signal of the monitoring radio wave WW (YES at step S18), calculates an angle corresponding to variation of the orientation of acceleration (angular variation) on the basis of the data of acceleration along each axis provided from the acceleration sensor (movement detector) 16. In a case where there is a difference of the angle (an angle difference) equal to or larger than a predetermined value (YES at step S19), it is determined that the antitheft device 10 has been taken out of the monitoring area together with the managed object MO. Such a case is handled as a warning-required state, since it is determined that the managed object MO is not only being taken in hand for observation or taken to the cashier, but also being transported to a prohibited area.

Figure 4:
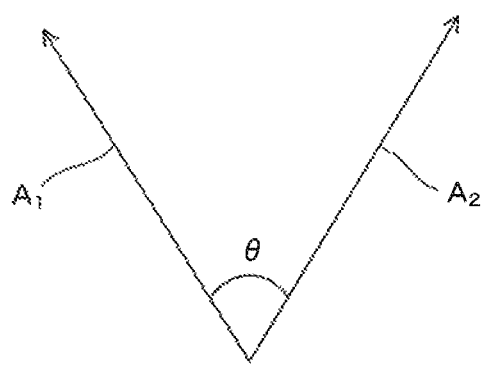
FIG. 4 is an explanatory diagram of a method of calculating angular variation with regard to acceleration of the antitheft device.

FIG. 4 is an explanatory diagram of a calculation method of angular variation corresponding to variation of the orientation of acceleration. Letting $A_1$ be the acceleration vector stored last time at steps 12 and S23, and A2 be the current acceleration vector, acceleration vectors $A_1$ and $A_2$ are expressed as follows:

$$A_1=(a_{1x}, a_{1y}, a_{1z})$$

$$A_2=(a_{2x}, a_{2y}, a_{2z})$$

Here, values $a_{1x}$, $a_{1y}$ and $a_{1z}$ are accelerations along respective axes of the acceleration sensor 16 at the previous storage, and values $a_{2x}$, $a_{2y}$ and $a_{2z}$ are current accelerations along respective axes of the acceleration sensor 16. Letting $\theta$ be the angle formed by the previous acceleration vector $A_1$ and the current acceleration vector $A_2$, an angle $\theta$ with varied acceleration may be obtained from the following relation:

$$\cos \theta = A_1 \cdot A_2/|A_1| \times |A_2|$$

Here, the inner product of the acceleration vectors $A_1$, and $A_2$ are given by:

$$A_1 \cdot A_2 = a_{1x} \times a_{2x} + a_{1y} \times a_{2y} + a_{1z} \times a_{2z}$$

, and the absolute value of the acceleration vector $A_1$ is given, for example, by:

$$|A_1|=\sqrt{(a_{1x}^2+a_{1y}^2+a_{1z}^2)}$$

Returning to FIG. 3, in a case where the angle difference has not been equal to or larger than a predetermined value (NO at step S19), it is determined that the antitheft device 10 is moving together with the managed object MO with no intention of theft and, after having returned to step S13 and transferred to the power saving operation mode, it is determined whether or not the antitheft device 10 has been removed (step S14). Determining the acceleration and angle as described above allows for increasing the reliability of determining whether or not a movement is attributed to theft. For example, even in a case where a movement has been detected due to a person's accidental collision with a shelf displaying commercial items, or a movement has been detected due to vibration caused by opening or closing a shutter of a store, it is possible to increase the reliability of determining whether or not the movement is not attributed to theft by performing the angle difference determination as described above, preventing malfunction thereby.

The microcomputer (controller) 18, upon entering an alarm-required state (YES at step S19), in other words, upon failing to receive a signal of the monitoring radio wave WW from the receiver 12 and also there is an angle difference equal to or larger than a predetermined value, given that a movement detection signal has been detected from the acceleration sensor (movement detector) 16, terminates the operation of the acceleration sensor (movement detector) 16 (step S20). Subsequently, the microcomputer (controller) 18 starts an alarming operation or a warning operation (step S21). In other words, the microcomputer (controller) 18 starts warning by triggering an alarm such as ringing of the buzzer 24, or the like, in a case where it has failed to receive a signal of the monitoring radio wave WW and also there is occurring a rapid variation of acceleration, given an input of a movement detection signal. The microcomputer (controller) 18 also releases (cancels) the power saving operation mode (step S22), terminates the operation of the acceleration sensor (movement detector) 16 (step S20), and starts an alarming operation or a warning operation (step S21), in a case where the antitheft device 10 has been removed (YES at step S14).

Here, when detecting the monitoring radio wave WW at step S18, it is possible to check the existence or absence of a signal of the monitoring radio wave WW by securing the detection timing of the monitoring radio wave WW over a certain period for a plurality of times, thereby increasing the reliability of take-out detection. For example, it is determined that the antitheft device 10 has been taken out of the monitoring area unless a plurality of times of checking confirm that the received signal of the monitoring radio wave WW has been continuously input, or it is not to be determined that the antitheft device 10 has been taken out of the monitoring area in a case where the received signal of the monitoring radio wave WW has been input at least once. Furthermore, there may also be a process such as determining that the antitheft device 10 has been taken out of the monitoring area unless a plurality of times of checking confirm that the received signal of the monitoring radio wave WW has been input for a defined number of times or more. Accordingly, detection becomes hard to be affected by radio wave circumstances. Similarly, when detecting a movement of the antitheft device 10 at step S15, checking the output of the acceleration sensor 16 for a plurality of times over a certain period, and using the result for determining whether or not the antitheft device 10 has been moved allows for increasing the reliability of take-out detection.

Although, in the foregoing description, a movement of the antitheft device 10 is continuously detected, and the receiver 12 is caused to detect the monitoring radio wave WW only when it is determined that the antitheft device 10 has moved, the receiver 12 and the acceleration sensor 16 may be operated in parallel and such a parallel operation may be either continuous or intermittent. When performing a parallel operation as described above, the microcomputer chip (controller) 18 may not receive a movement detection signal from the acceleration sensor 16 even in the absence of an input of an un-detection signal of the monitoring radio wave WW, in which case no warning operation is performed. In other words, even in a case where no input of a signal of the monitoring radio wave WW is received from the receiver 12, operation of the transmitter 50 may be terminated due to blackout, checking, closure, or the like, and such a case is not processed as a warning-required state unless the antitheft device 10 is placed in the acceleration environment.

Figure 5A:
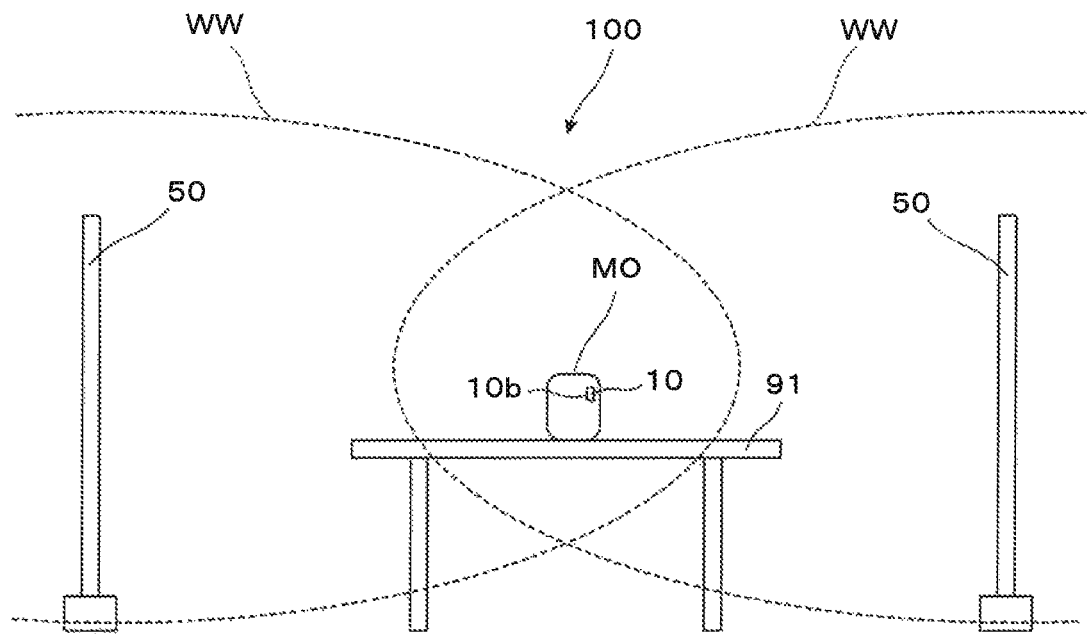
FIG. 5A and FIG. 5B are conceptual diagrams of operations of the tag of FIG. 1 and the system of FIG. 2.
Figure 5B:
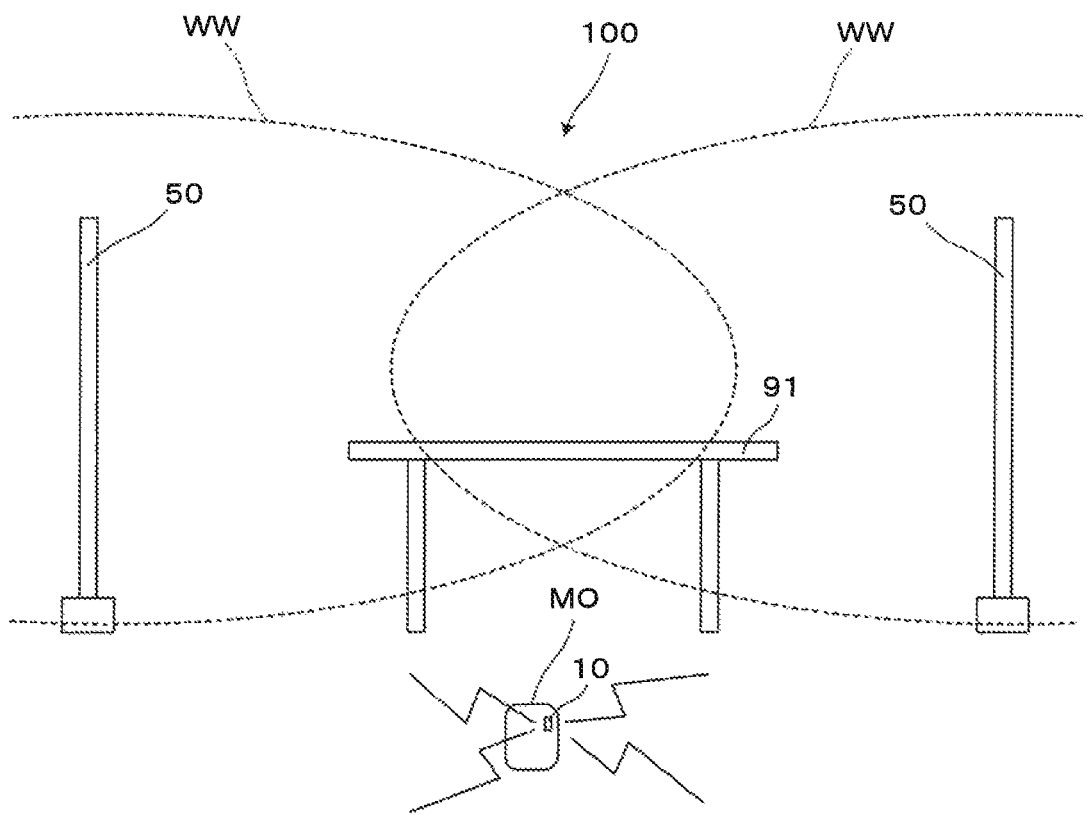

FIG. 5A and FIG. 5B are conceptual diagrams for explaining an exemplary application of the crime prevention system 100. The managed object MO having the antitheft device 10 attached thereto is provided on a pedestal 91 which is a retail shelf or a display shelf, and is located within a monitoring area. The antitheft device 10 determines that it is not in a warning-required state, as long as it is not detecting a movement detection signal from the acceleration sensor 16, or regularly receiving a detection result of the monitoring radio wave WW from the receiver 12 (see FIG. 5A). The antitheft device 10, upon detecting a movement detection signal from the acceleration sensor 16, with the angular variation of acceleration exceeding a given prescribed value, and also failing to receive the monitoring radio wave WW from the receiver 12, may be in a warning-required state and starts an alarm operation or a warning operation by ringing the buzzer 24 (see FIG. 5B). Here, it is not possible to conclude that the managed object MO is being transported to a prohibited area only by the fact that a movement detection signal is detected from the acceleration sensor (movement detector) 16 and the angular variation of acceleration has exceeded a given prescribed value, and therefore it is determined whether or not a detection signal of the monitoring radio wave WW has been successfully received from the receiver 12, and, in a case where a movement detection signal has been detected under a specific condition using the acceleration sensor 16, it is concluded that the managed object MO is moving in a prohibited area. Performing a double check as thus described allows the warning using the buzzer 24 or the like to be more appropriate and reliable.

According to the antitheft device 10 and the crime prevention system (antitheft system) 100 described above, a warning operation is performed in a case where the microcomputer (controller) 18 has determined that it is located at a position where it is impossible to detect the monitoring radio wave WW of a predetermined frequency by the receiver 12, whereby it suffices to attach the antitheft device 10 to the managed object MO such as an commercial item to be monitored, and it is not necessary to extend the cable from the sensor part attached to the commercial item.

Although the present invention has been explained above in accordance with the embodiment, the present invention is not limited to the embodiment described above.

For example, although the acceleration sensor 16 is used as a movement detector in the embodiment described above, various types of sensors, electric or mechanical, may be used in place of the acceleration sensor. Specifically, a gyro sensor, a vibration sensor, a geomagnetic sensor, a GPS sensor, or the like, may be used as the movement detector. Detection of a movement of the antitheft device 10 by the movement detector may not only be simply determining whether or not acceleration, or the like, has varied beyond a certain threshold value, or angular variation of acceleration has varied beyond a given prescribed value or threshold value, but also checking the pattern or the number of times by which acceleration or the like periodically varies, which allows for step counting of the act of taking out the antitheft device 10, whereby it becomes possible to determine that a movement of the antitheft device 10 has been detected in a case where the number of steps has exceeded a limit value such as ten steps, for example.

In addition, although an angle corresponding to the amount of variation of acceleration of the antitheft device 10 is stored in the embodiment described above (steps S12 and S23), such a process may be omitted to simplify the determination process.

Figure 6:
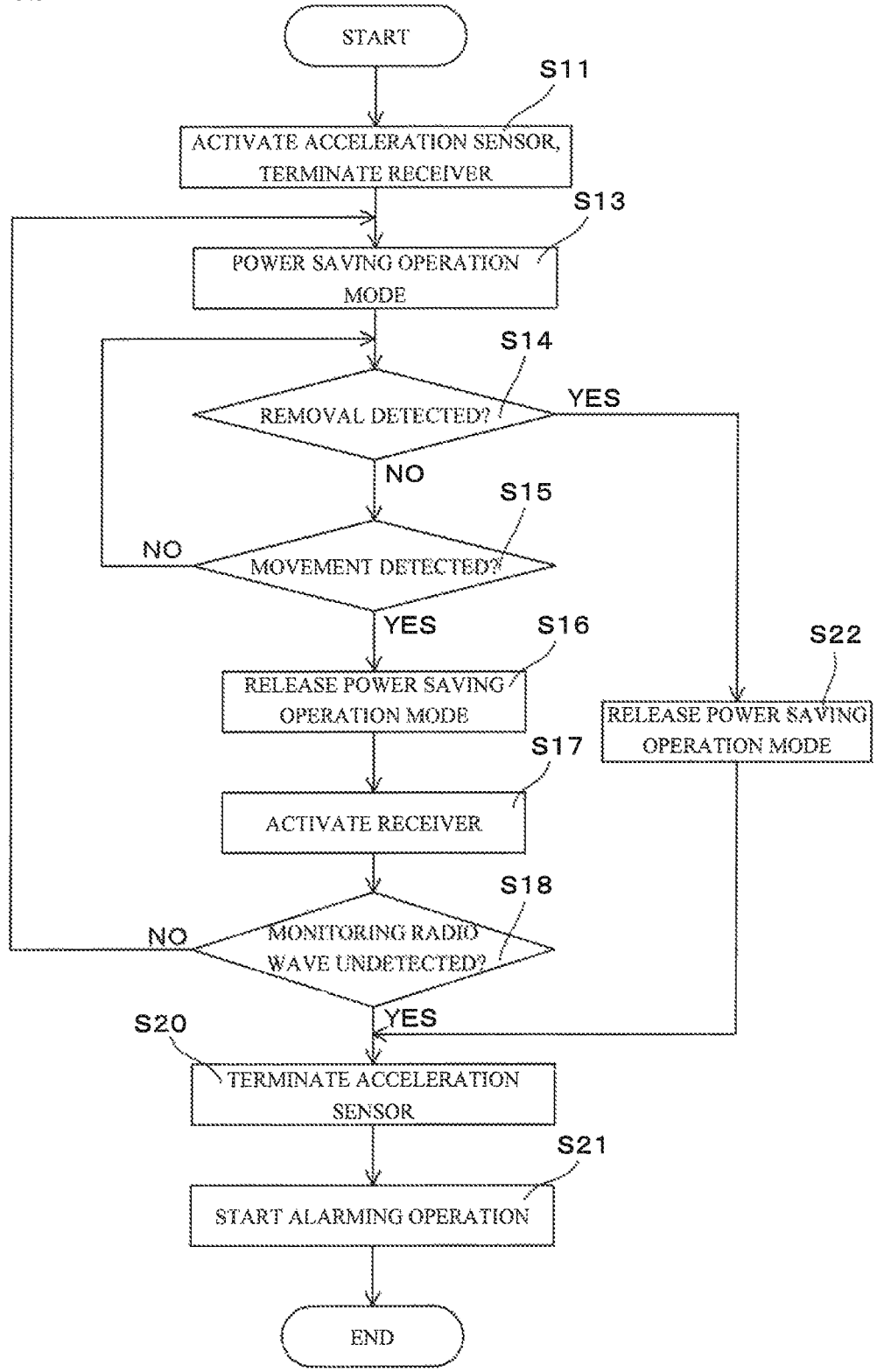

FIG. 6 is a flowchart of a process according to a simplified exemplary variation. The process illustrated in FIG. 6 is a partial modification of the process illustrated in FIG. 4, with explanation of common parts being omitted.

The microcomputer (controller) 18, upon entering a warning-required state (YES at step S18), in other words, upon failing to receive a signal of the monitoring radio wave WW from the receiver 12, given that a movement detection signal indicating a predetermined angular variation or more has been detected from the acceleration sensor (movement detector) 16, terminates the operation of the acceleration sensor (movement detector) 16 (step S20). Subsequently, the microcomputer (controller) 18 starts a warning operation (step S21). In other words, the microcomputer (controller) 18, upon failing to receive a signal of the monitoring radio wave WW assuming an input of a movement detection signal, starts an alarm operation by ringing the buzzer 24, or the like.

Figure 7:
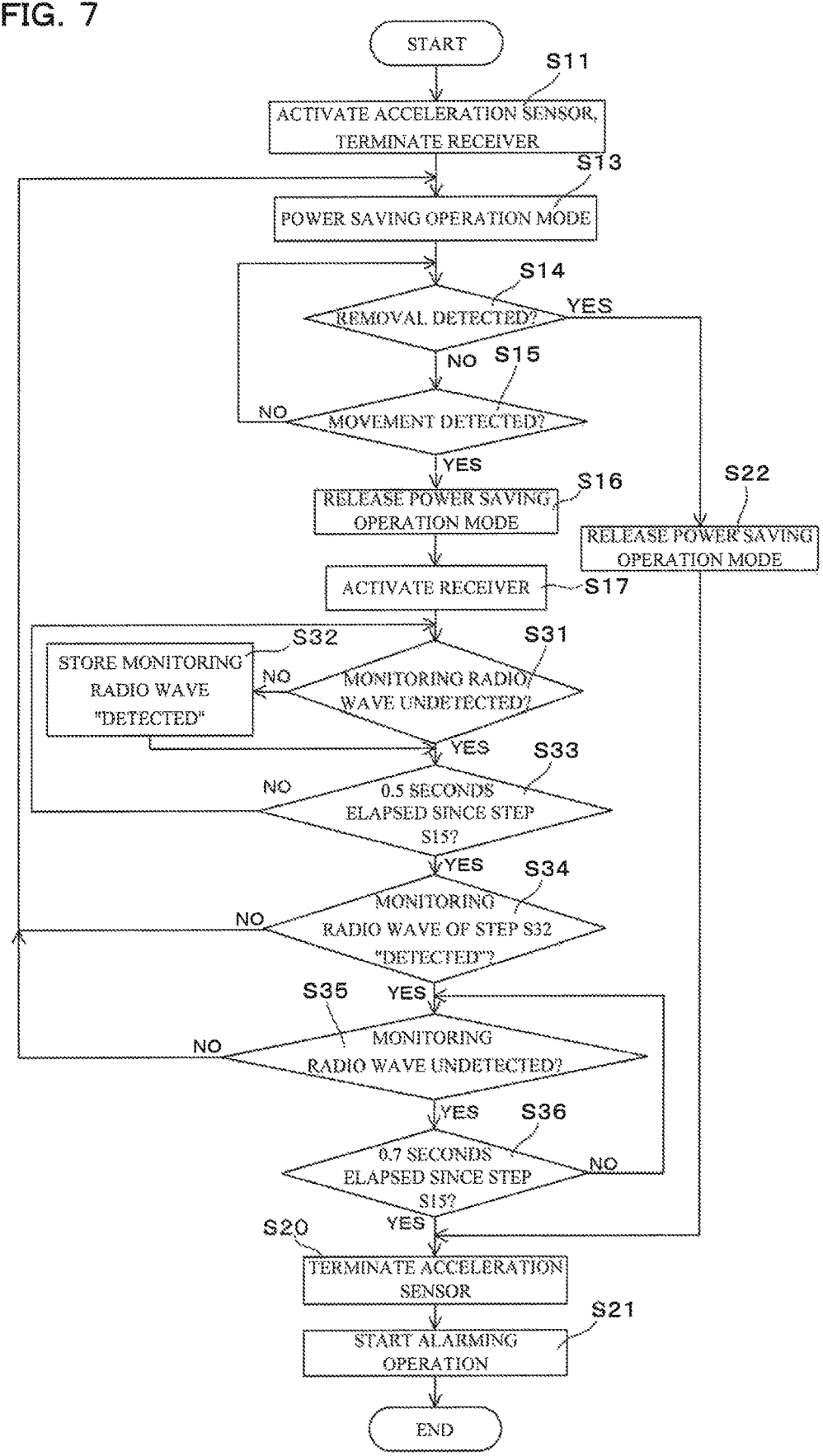

FIG. 7 is a flowchart for explaining another exemplary variation. The process illustrated in FIG. 7 is a partial modification of the process illustrated in FIG. 6, with explanation common parts being omitted.

The microcomputer (controller) 18, upon detecting a movement detection signal from the acceleration sensor (movement detector) 16 (YES at step S15), causes the receiver 12 to start detecting the monitoring radio wave WW (step S17). Furthermore, the microcomputer (controller) 18 determines the feasibility of detecting the monitoring radio wave WW (step S31). The microcomputer (controller) 18 stores information that the monitoring radio wave WW is "detected" in the storage 18*m* (step S32) in a case where the monitoring radio wave WW has been detected (NO at step S31), or determines whether or not 0.5 seconds, for example, have elapsed since the detection of the movement at step S15 (step S33), in a case where the monitoring radio wave WW has been undetected (YES at step S31). In a case where 0.5 seconds, for example, have elapsed since the detection of the movement at step S15, the microcomputer (controller) 18 regards that un-detection of the monitoring radio wave WW is certain, and determines, referring to the storage 18*m*, whether or not a "detected" state of the monitoring radio wave WW is entered (step S34). In a case where it is determined at step S34 that a "detected state" is not entered for the monitoring radio wave WW, the microcomputer (controller) 18 returns to step S14 and determines whether or not the antitheft device 10 has been removed. On the other hand, in a case where it is determined at step S34 that a "detected" state of the radio wave WW is entered, the microcomputer (controller) 18 determines un-detection of the monitoring radio wave WW again (step S35), and repeats the determination of un-detection of (or, determination of feasibility of detecting) the monitoring radio wave WW until 0.7 seconds, for example, have elapsed since the detection of the movement at step S15. Although the microcomputer (controller) 18 returns to step S14 and determines whether or not the antitheft device 10 has been removed in a case where the monitoring radio wave WW is detected during the aforementioned period, the microcomputer (controller) 18 terminates the operation of the acceleration sensor (movement detector) 16 (step S20) unless the monitoring radio wave WW is detected during the aforementioned period, and also starts an alarm operation or a warning operation (step S21), assuming that the state has been certainly switched from the "detected" state to the "undetected" state of the monitoring radio wave WW. In this example, an alarming operation or a warning operation is not performed in a case where the "undetected" state of the monitoring radio wave WW is being maintained although a movement of the antitheft device 10 has been detected. The foregoing results from considering the user's circumstances, such as, for example, changing the arrangement of a number of commercial items due to circumstances such as redecoration with the monitoring radio wave WW being disabled, whereby it is possible to collectively avoid triggering of an alarming operation without disabling the operation of each of the antitheft devices 10. Note that the 0.5 seconds taken for the determination at step S33 and the 0.7 seconds for the determination at step S36 are merely illustrative, and that it is possible to set an appropriate period of time in a range that allows for increasing the reliability of radio wave detection, provided that the number of seconds taken for the determination at step S36 is set larger than the number of seconds for the determination at step S33.

In addition, although a case has been explained where the managed object MO is a commercial item in the embodiment described above, the crime prevention system (antitheft system) 100 may also be installed in a medical institution, a university, or the like, without being limited to a store.

The transmitter 50 may be installed on various places such as a ceiling, a wall surface or a gate, without being limited to installation on a floor.

The antitheft device 10 may have a wireless transmission device. Such a wireless transmission device may be driven and operated by the microcomputer 18, and notify that the antitheft device 10 is performing an alarming operation or a warning operation by wirelessly transmitting a warning signal to a higher-level device.

The frequency of the radio wave emitted from the transmitter 50 may be set to various frequencies without being limited to 8.2 MHz, and radio waves of a plurality of frequencies may be emitted.

The antitheft device 10 is not limited to a self-ringing antitheft tag and may be of a type that turns on an LED without being accompanied by ringing of the buzzer 24, or may be of a type that does not cause the antitheft tag attached to the managed object to perform a warning operation by itself, but causes another device to perform a warning operation.

The invention claimed is:

1. An antitheft device removably attached to an object, the device comprising:
   a receiver that receives a radio wave of a predetermined frequency;
   a controller that determines whether or not the antitheft device is located at a position where it is unable to detect the radio wave of the predetermined frequency by the receiver, and performs a warning operation upon determining that the removably attached antitheft device is located at a position where it is unable to detect the radio wave of the predetermined frequency; and a movement detector that detects movement of a main body including the receiver and the controller;

wherein the controller performs the warning operation upon detecting the movement of the main body and also failing to detect the radio wave of the predetermined frequency, determining an angle of acceleration, and determining a difference of the angle equal to or larger than a predetermined value.

2. The antitheft device according to claim 1, wherein the movement detector is one of: an acceleration sensor, a gyro sensor, a vibration sensor, a geomagnetic sensor, and a GPS sensor.

3. The antitheft device according to claim 1, wherein the controller operates the receiver intermittently.

4. The antitheft device according to claim 1, wherein the controller operates the receiver upon the movement detector detecting a movement.

5. An antitheft system including the antitheft device according to claim 1, and a transmitter that transmits a radio wave of the predetermined frequency.

* * * * *